(12) United States Patent
Bradley (10) Patent No.: US 10,994,791 B2
(45) Date of Patent: May 4, 2021

(54) AERODYNAMIC TRAILER SYSTEM WITH DUAL STIFFNESS SKIRT

(71) Applicant: Compagnie Generale des Etablissements Michelin, Clermont-Ferrand (FR)

(72) Inventor: Calvin Rhett Bradley, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 194 days.

(21) Appl. No.: 16/339,620

(22) PCT Filed: Nov. 14, 2017

(86) PCT No.: PCT/US2017/061537
§ 371 (c)(1),
(2) Date: Apr. 4, 2019

(87) PCT Pub. No.: WO2018/097991
PCT Pub. Date: May 31, 2018

(65) Prior Publication Data
US 2020/0039587 A1    Feb. 6, 2020

Related U.S. Application Data

(63) Continuation of application No. PCT/US2016/063262, filed on Nov. 22, 2016.

(51) Int. Cl.
*B62D 35/00* (2006.01)
*B60R 19/56* (2006.01)
(Continued)

(52) U.S. Cl.
CPC ......... *B62D 35/001* (2013.01); *B62D 35/008* (2013.01); *B60R 19/565* (2013.01);
(Continued)

(58) Field of Classification Search
CPC .... B62D 35/001; B62D 35/008; B62D 35/02; B62D 37/02; B60R 19/565; Y02T 10/82
(Continued)

(56) References Cited

U.S. PATENT DOCUMENTS 8,899,660 B1   12/2014   Praskovskaya
9,139,241 B1    9/2015   Smith
(Continued)

FOREIGN PATENT DOCUMENTS

CA        2693953 A1     9/2011

OTHER PUBLICATIONS

European Patent Office; International Search Report and Written Opinion for patent application PCT/US2016/063262; dated Aug. 24, 2017; Publisher: European Patent Office, Rijswijk, Netherlands, pp. 1-14, enclosed.

(Continued)

*Primary Examiner* — D Glenn Dayoan
*Assistant Examiner* — E Turner Hicks
(74) *Attorney, Agent, or Firm* — Neal P. Pierotti (57) ABSTRACT

An aerodynamic trailer system is provided that has a skirt support member with a trailer attachment that attaches the skirt support member to a trailer. The skirt support member has a skirt attachment that attaches the skirt support member to a skirt. The skirt has a height that extends in a vertical direction of the aerodynamic trailer system. The skirt has an upper side, a lower side, a front side, and a rear side. The skirt also has a lower section that extends in the vertical direction from the lower side to an attachment location with the skirt attachment. The skirt has an upper section that extends in the vertical direction from the attachment location to the upper side. The lower section has a higher bending stiffness than the upper section.

14 Claims, 5 Drawing Sheets

(51) Int. Cl.
  *B62D 35/02*   (2006.01)
  *B62D 37/02*   (2006.01)
  *F16M 13/02*   (2006.01)

(52) U.S. Cl.
  CPC .............. *B62D 35/02* (2013.01); *B62D 37/02* (2013.01); *F16M 13/02* (2013.01)

(58) Field of Classification Search
  USPC ................................ 296/180.4, 180.1, 181.5
  See application file for complete search history.

(56) References Cited

U.S. PATENT DOCUMENTS

| | | | |
|---|---|---|---|
| 2009/0189414 A1 | 7/2009 | Boivin | |
| 2010/0264690 A1* | 10/2010 | Brown | B60R 19/56 296/180.4 |
| 2012/0091754 A1* | 4/2012 | Lee | B62D 35/001 296/180.4 |
| 2013/0119701 A1 | 5/2013 | Dayton | |
| 2015/0259014 A1* | 9/2015 | Baker | B62D 35/008 296/180.4 |

OTHER PUBLICATIONS

European Patent Office; International Search Report and Written Opinion for patent application PCT/US2017/061537; dated Feb. 21, 2018; Publisher: European Patent Office, Rijswijk, Netherlands, pp. 1-14, enclosed.

* cited by examiner

AERODYNAMIC TRAILER SYSTEM WITH DUAL STIFFNESS SKIRT

CROSS-REFERENCE TO RELATED APPLICATIONS

The present application is a 35 U.S.C. § 371 application of PCT/US2017/061537 filed on Nov. 14, 2017 and entitled "Aerodynamic Trailer System with Dual Stiffness Skirt." PCT/US2017/061537 claims the benefit of PCT/US2016/063262 filed Nov. 22, 2016 and entitled "Aerodynamic Trailer System with Dual Stiffness Skirt." PCT/US2017/061537 and PCT/US2016/063262 are both incorporated by reference herein in their entireties for all purposes.

FIELD OF THE INVENTION

The subject matter of the present invention relates to an aerodynamic system for a trailer that includes a trailer skirt that has a dual stiffness. More particularly, the present application involves an aerodynamic trailer system that features a skirt attached to the trailer via a skirt support member in which the skirt has a lower section that is more rigid than an upper section of the skirt.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. However, there are issues with the skirt being either too flexible and not holding their shape or being too rigid and non-resilient when encountering objects or ground-features that may impact the skirt, which may result in damage to the skirt and/or the trailer.

It is therefore the case that trailer skirts should be rigid enough in their normal operating condition to appropriately deflect air and prevent drag on the moving trailer. However, the skirt needs to exhibit some degree of flexibility because it is close to the ground and can hit curbs, snow, road debris, or other objects thus necessitating movement of the skirt to avoid the skirt from being detached or damaged. It is known to provide skirt support members attached to the trailer that attach the skirt to the trailer. These skirt support members themselves can flex to accommodate flexing of the skirt when the skirt strikes an object. However, the skirt itself is made with a stiffness strong enough to prevent bending in normal use, thus increasing the chances the skirt will break or become damaged when an object strikes the skirt since the skirt itself is not as compliant. As the bending moment that is imparted onto the skirt is greatest at the location closest to the trailer, it is the case that this area is strengthened, for example by making the skirt at the top of a large thickness, to counteract this bending moment. Although skirt designs are known for increasing aerodynamic properties, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all subranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an aerodynamic trailer system 10 that features a skirt 20 supported by one or more skirt support members 12 underneath a trailer 16 that functions to increase aerodynamic properties of the trailer 16 during travel. The skirt 20 has an upper section 40 that is higher in a vertical direction 26 than a lower section 36 of the skirt 20. The lower section 36 is stiffer than the upper section 40. This increased stiffness can be a result of having the lower section 36 be thicker than the upper section 40, by having the lower section 36 be made of a stiffer material than the upper section 40, or by a combination of both. The skirt support members 12 function by their presence to stiffen the upper section 40 and because of the stiffness imparted by these members 12, the upper section 40 does not need to be as stiff as the lower section 36. This reduction in stiffness allows the upper section 40 to be flexed when the skirt 20 hits an object on the road, but the area is still capable of retaining its shape during normal travel of the vehicle due to the stiffness imparted by the presence of the skirt support members 12.

Figure 1:
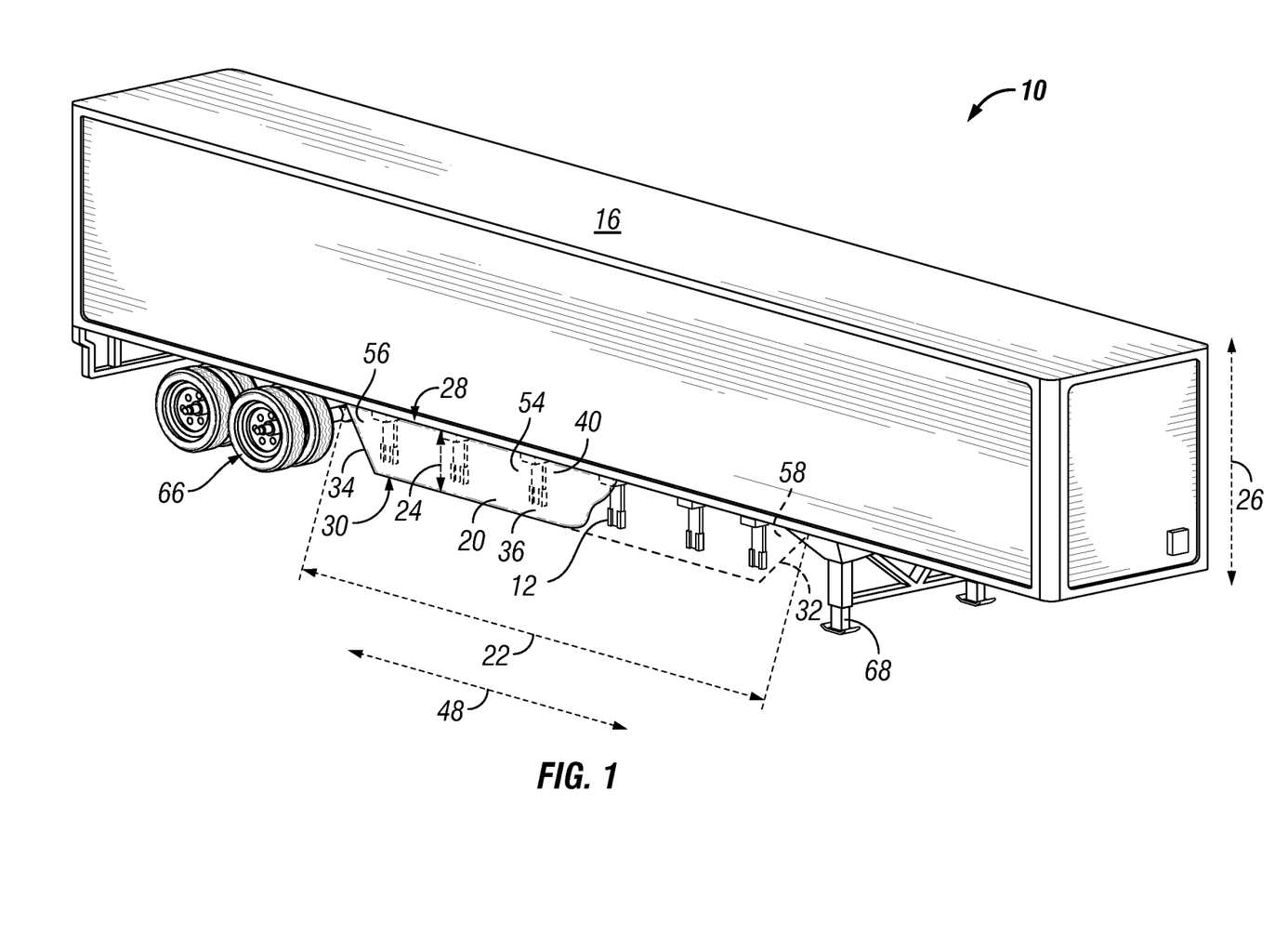
FIG. 1 is a perspective view of an aerodynamic trailer system attached to a trailer with a portion of the skirt shown in hidden line for clarity.

An aerodynamic trailer system 10 is illustrated with reference to FIG. 1 in which the skirt 20 is located under the trailer 16 and prevents air from hitting the rear wheels 66 of the trailer 16 during travel of the trailer 16. The skirt 20 extends in a longitudinal direction 48 of the aerodynamic trailer system 10 and may be oriented at an angle to the trailer 16 or in some instances may extend in the same direction as the length of trailer 16. The skirt 20 can have any length in the longitudinal direction 48 but generally extends from the rear wheels 66 to the vertical support 68 of the trailer 16. A second skirt (not shown) can be located on the opposite side of the trailer 16 to prevent or direct air flow related to the opposite side. Any number of support members 12 may be used to support the skirt 20 and cause it to be attached to the trailer 16. For example, from 1-5, 6, 7, from 8-10, or up to 30 support members 12 may be present in the aerodynamic trailer system 10 to support the skirt 20 and they may all be configured the same as or differently from one another. The opposite skirt (not shown) may likewise have any number of support members integrated therewith for its support.

The skirt 20 has a height 24 that extends in the vertical direction 26 of the aerodynamic trailer system 10. The height 24 extends from the underside of the floor of the trailer 16 to a location just above the road surface or in other words to a vertical point near the vertical position of the bottom of the rear wheels 66. The height 24 of the skirt 20 may be selected so that it is large enough to cover the necessary area of air deflection that is desired, yet small enough so that it is not scraping the ground or otherwise easily hitting the road surface or objects resting on the road surface. It is presumed, however, that in the normal course of driving the skirt 20 will strike objects when the trailer navigates curves, goes over objects, reaches a crown in the road, hits a snowbank, or otherwise engages anything found on roads or in distribution centers.

A back view of the skirt 20 with the attached skirt support members 12 of the aerodynamic trailer system 10 is illustrated with reference to FIG. 2. The skirt support members 12 are located at the top of the skirt 20 in the vertical direction 26 and are generally spaced evenly from one another in the longitudinal direction 48. The skirt support members 12 extend from the top of the skirt 20 downward in the vertical direction but do not extend the entire length of the height 24 of the skirt 20. Instead, the skirt support members 12 stop short of the bottom of the skirt 20. The skirt 20 has a length 22 that extends in the longitudinal direction 48. The skirt 20 may be a single piece member made up of one component, or can be multiple components that are attached to one another. In the embodiment in FIG. 2, the skirt 20 is made from a plurality of central panels 54 that are attached to one another to form almost the entire length 22. A rear trailer skirt panel 56 forms the back end of the skirt 20 and is attached to the tailing central panel 54. The rear trailer skirt panel 56 has a shape and size different than the central panel 54 to which it is attached. A front trailer skirt panel 58 is located at the front of the skirt 20 and is attached to and shaped and sized differently than the leading central panel 54.

The skirt 20 has an upper side 28 that is highest in the vertical direction 26 and is the portion of the skirt 20 that is attached to or located against the underside of the trailer 16. The lower side 30 of the skirt is opposite the upper side 28 and is at the bottom of the skirt 20 and extends in a generally linear fashion, although it may be curved or have other architecture therein in other embodiments. A front side 32 of the skirt extends from the lower side 30 to the upper side 28 and is angled in length such that it does not extend completely in a straight line. The front side 32 is arranged in the forward direction of the trailer 16. An oppositely disposed rear side 34 likewise extends from the upper side 28 to the lower side 30, and is located at the back end of the skirt 20 on the side opposite from the front side 32. The rear side 34 is curved in shape and does not extend in a completely straight line.

The skirt support member 12 is attached to the skirt 20 at a skirt attachment 18 of the skirt support member 12. The skirt attachment 18 may be a bolted attachment, a welded attachment, an interlocking attachment, a snapped attachment, or an attachment made through any mechanical means. The skirt attachment 18 is the attachment point of the skirt support member 12 to the skirt 20 at the lowest point in the vertical direction 26. This attachment point may be effected through a number of bolts and the actual skirt attachment 18 denoted may be at a vertical location of the highest bolt, the lowest bolt, the bolt in the middle of all of the bolts, or any other one of the bolts in the series of bolts connecting the skirt support member 12 to the skirt 20. As shown in FIG. 2, the skirt attachment 18 is located at the middle of the bolts and thus represents the bolt that is in the midpoint of the bolts effecting attachment of the skirt 20 to the skirt support member 12. The skirt attachment 18 separates the skirt 20 into a lower section 36 that is located below the skirt attachment 18 in the vertical direction 26, and into an upper section 40 located above the skirt attachment 18 in the vertical direction 26. The upper section 40 and lower section 36 may extend across the entire length 22 in some embodiments. If multiple skirt attachments 18 are present due to multiple skirt support members 12 being present, the lower and upper sections 36, 40 may be at different heights in the vertical direction 26 across the length 22.

Figure 2:
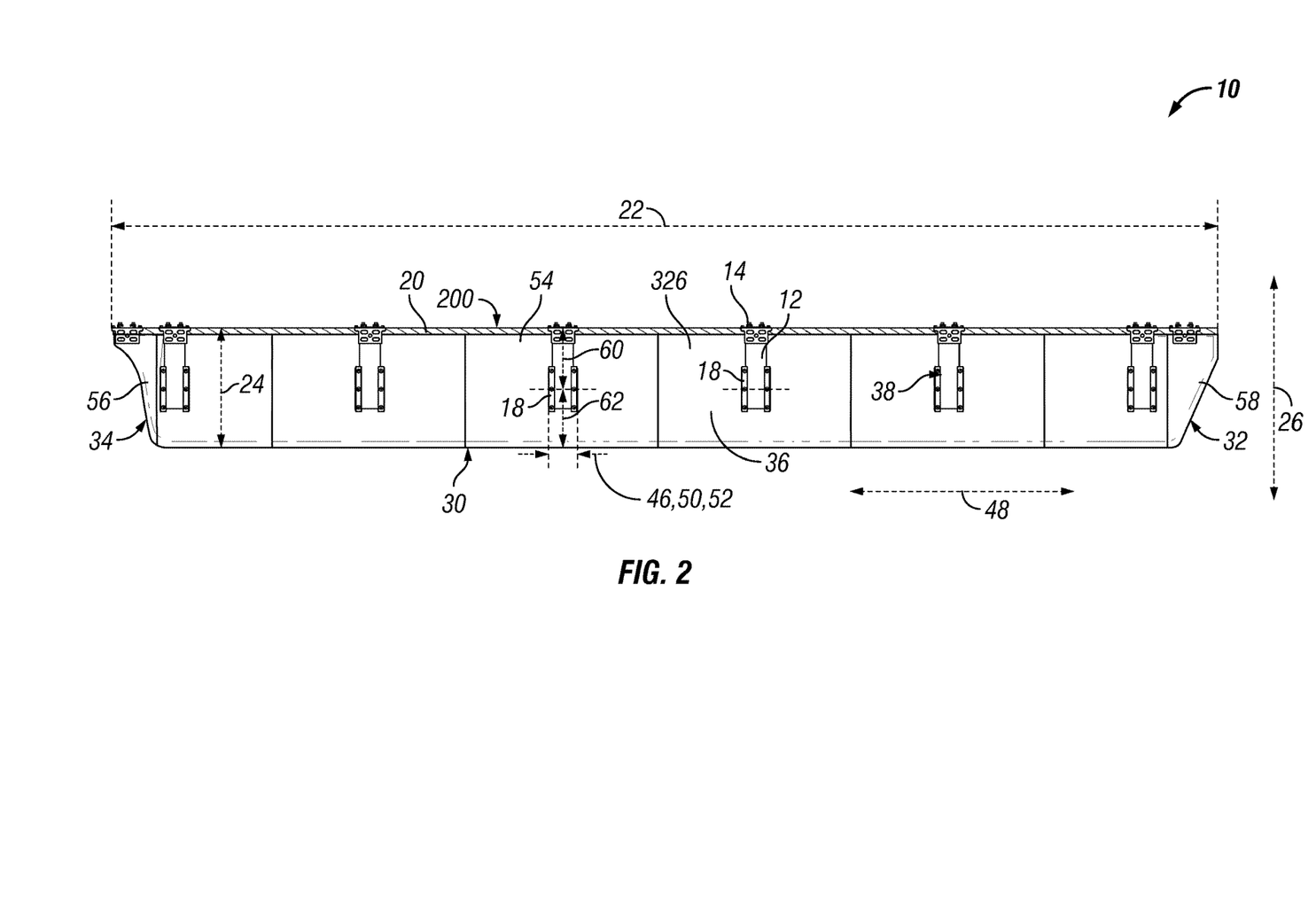
FIG. 2 is a back elevation view of the aerodynamic trailer system of FIG. 1.

In the embodiment in FIG. 2, the lower section 36 has a length 50 that extends in the longitudinal direction 48 that is the same as the length 46 of the skirt support member 12 that extends in the longitudinal direction 48. In a similar manner, the upper section 40 has a length 52 that extends the same amount in the longitudinal direction 48 as does the length 46. In the embodiment shown, the lengths 50, 52 of the lower and upper sections 36, 40 do not extend completely across the skirt 20 in the longitudinal direction 48 but instead extend only the length 46 of the skirt support member 12. However, the lower section 36 will extend a length 62 in the vertical direction 26 all the way from the skirt attachment 18 to the lower side 30. In a similar manner, the upper section 40 extends from the skirt attachment 18 to the upper side 28 a length 60 that covers this entire distance. As such, although the lower and upper skirt sections 36, 40 may not extend the entire length 22 when combined, they do extend the entire height 24 when combined.

The skirt support members 12 may be configured in a variety of manners in accordance with different exemplary embodiments so that they perform the functions of attaching the skirt 20 to the trailer 16 while supporting the skirt 20 and allowing for bending of the skirt 20 to take place when the skirt 20 engages an object. The skirt support member 12 may comprise a rigid or flexible member, may be elongate, and can be attached to the skirt 20 using any desired mechanism, such as by use of one or more fasteners, weldments, adhesives, clamps, and/or mounting brackets as previously stated. The skirt support member 12 has a trailer attachment 14 that is typically a bolted attachment that connects to framework on the underside of the floor of the trailer 16.

In certain embodiments, as discussed further below, the skirt support member 12 is a bi-modulus bending member, and the step of attaching comprises attaching a bi-modulus skirt support member to a trailer 16 in a cantilevered configuration. One such skirt support member 12 is illustrated with reference to FIGS. 3-5. It is appreciated that in any cantilevered configuration, the bi-modulus bending member may be fixedly attached at any point along its length, including at a terminal end thereof. It is also appreciated that the bending member may be attached in any desired manner, such as by use of one or more fasteners, weldments, adhesives, clamps, and/or mounting brackets, for example. In particular embodiments, attachment is achieved by attaching a trailer mounting bracket that is the trailer attachment 14 to a trailer 16, the bi-modulus bending member being operably attached to the trailer mounting bracket 14. The trailer attachment 14 is the widest portion of the skirt support member 12 and extends a length 46, but in other arrangements different portions of the skirt support member 12 aside from the trailer attachment 14 may be the widest portion of the skirt support member 12. Extending from the trailer attachment 14 in the vertical direction 26 is an elongate element 64. The elongate element 64 is mounted to the trailer attachment 14 with a connection that does not pivot but is generally static. In some arrangements, and as shown in FIG. 4, the elongate element 64 is retained within a resilient member, which is made of an elastomeric material, that permits the elongate element 64 to twist while remaining fixed in certain directions within the trailer attachment 14 by a pin extending through the elongate element 64 and into the trailer attachment 14. The skirt attachment 18 is connected to the skirt 20 with a connection that does not pivot. As shown, six bolts are used to attach the skirt attachment 18 to the skirt 20. The elongate element 18 engages the skirt attachment 18 and is held therein. In some embodiments, the elongate element 18 is non-pivotally attached to the skirt attachment 18 and does not move therewith. For example, the elongate element 18 may be bolted to the skirt attachment 18. In other arrangements, the elongate element 18 may slide relative to the skirt attachment 18. The elongate element 64 may have any cross-sectional shape, and as illustrated is made of two elongated plates that are V-shaped and that face one another.

The elongate element 64 is designed to resist an applied force without noticeably bending or deforming, but when the applied force exceeds a designed threshold force, the bi-modulus elongate element 64 elastically bends into a bent arrangement, which may bifurcate the bi-modulus elongate element 64, and elastically returns to its original or unbent arrangement. When bending, the bi-modulus elongate element 64 buckles (that is, the cross-section buckles), whereby the cross-section shape (profile) changes from a first cross-section shape to a second cross-section shape. The first cross-sectional shape is shown with reference to FIGS. 3-5, and the second cross-sectional shape is shown with reference to FIG. 6. By doing so, the bi-modulus elongate element 64 and each of the one or more plates forming the elongate element 64 elastically buckle and bend to a buckled configuration when an applied force (such as its lateral force component) exceeds a threshold force and elastically return to an unbuckled or unbent configuration when the applied force is reduced below the threshold force or removed. Stated differently, the bi-modulus elongate element 64, and in effect the skirt support member 12, can be characterized as being a bi-modulus (or bi-stable) member, where each member or element resists bending with a first bending modulus until it buckles or collapses and thereafter bending ensues without any notable plastic deformation or resistance, where the buckled cross-section has a second bending modulus.

In particular embodiments, the bi-modulus characteristic is accomplished by the elongate element 64 being a thin-walled member, having a sufficiently thin thickness, such as a thickness of 1.0 millimeters (mm) or less, or 0.5 mm or less, for example. In certain embodiments, each elongate element 64 is made of a sheet of spring steel that is 0.5 mm or less thick, and in other variations, made from any other similarly thin product made of a material other than steel, whether inelastic or elastic, such as any metal, polymer, or other material. Additionally, or in the alternative, in certain embodiments, the bi-modulus characteristic for an elongate element 64 is accomplished by the height of the cross-section being less than the width. By increasing the height, the bending stiffness increases, while decreasing the height, the bending stiffness decreases. It is also noted that when employing a plurality of stacked elongate elements 64, the stacked elongate elements 64 are able to slide relative each other, which also facilitates the bi-modulus behavior. Moreover, the bi-modulus characteristic may be further accomplished by the unbent or unbuckled cross-section being asymmetrical, the cross-section being asymmetric relative to a centerline extending in a direction of the element's 64 width. The centerline forms a neutral bending axis or a line that divides the cross-sectional area into equal halves. It is appreciated that any cross-section of the elongate element 64 may be constant or variable in size and/or shape along the length of each elongate element 64. Although shown as V-shaped, the elongate element 64 can be variously shaped in other embodiments, and may be selected of material that is of a desired thickness.

Figure 3:
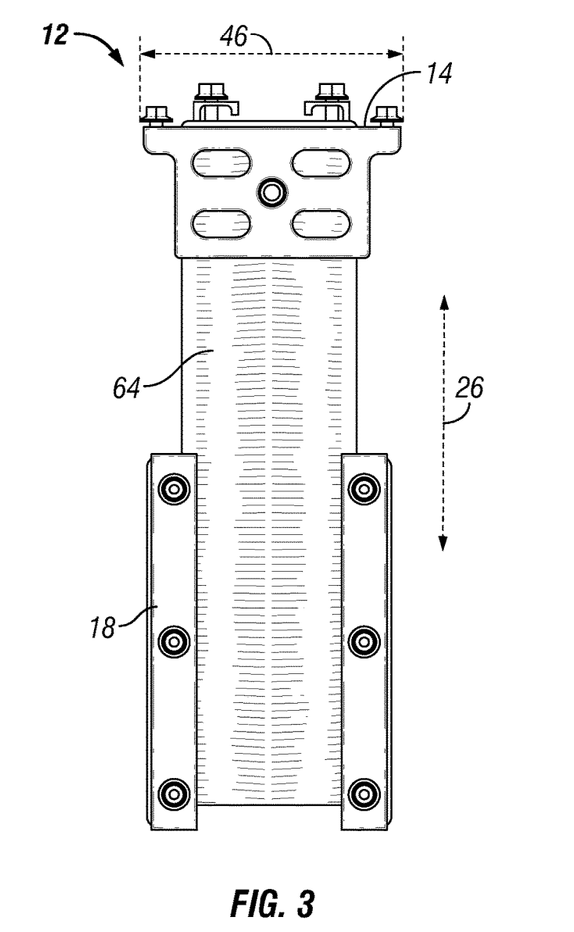
FIG. 3 is a back elevation view of a skirt support member.
Figure 4:
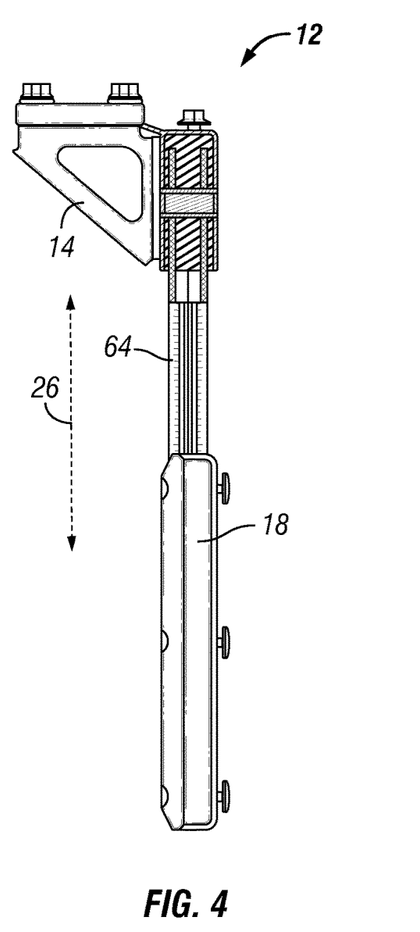
FIG. 4 is a side elevation view of the skirt support member of FIG. 3.
Figure 5:
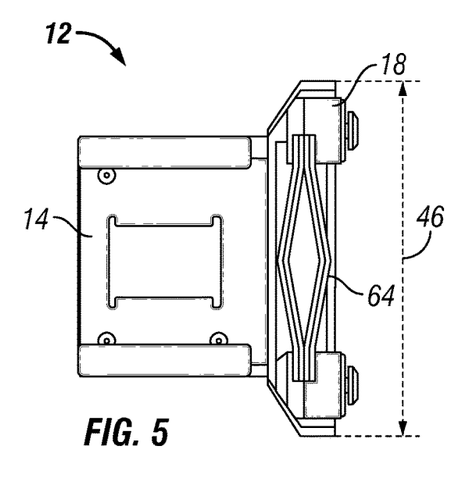
FIG. 5 is a bottom plan view of the skirt support member of FIG. 3.
Figure 6:
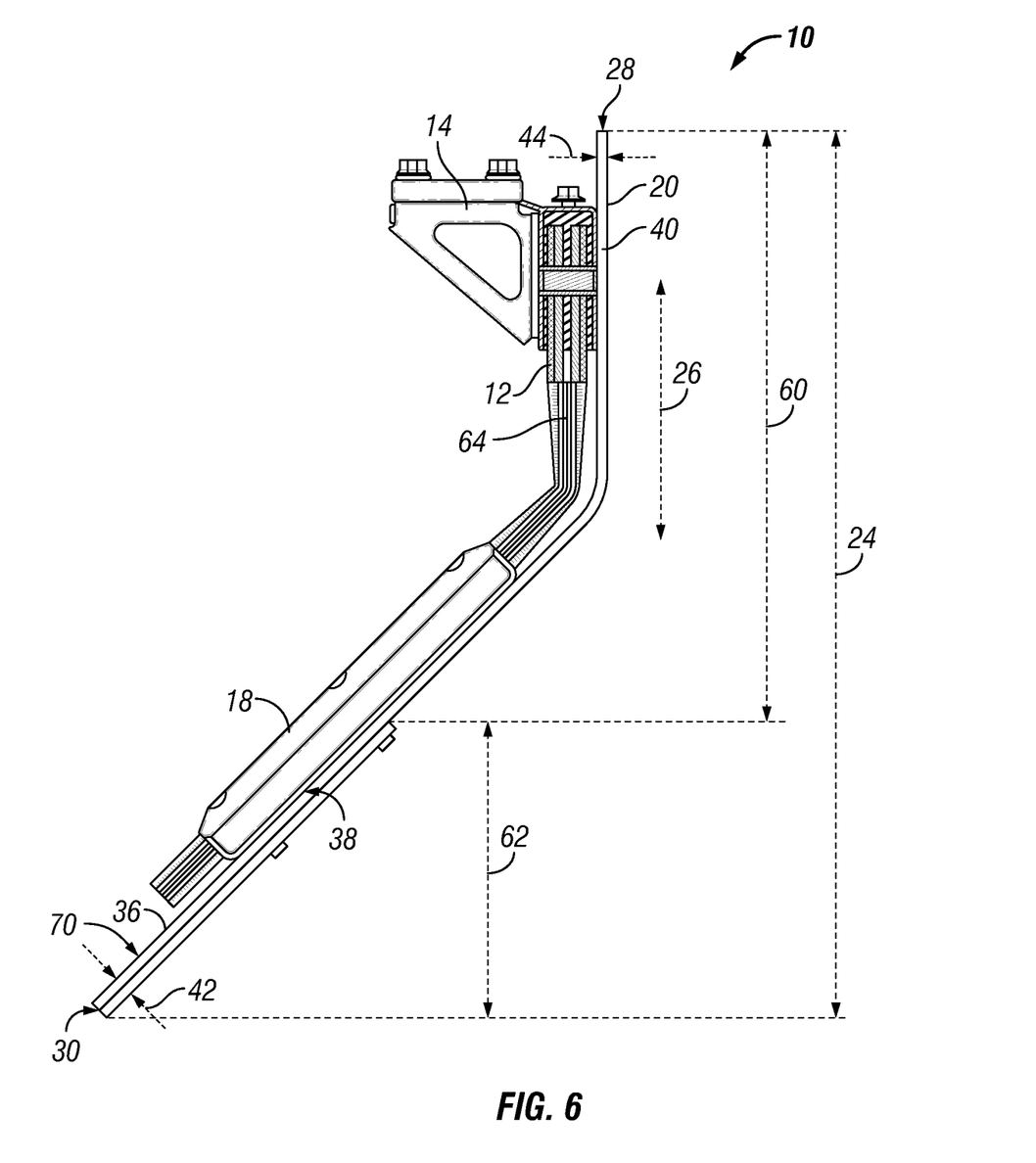
FIG. 6 is a side elevation view in partial cross-section of an aerodynamic trailer system with the skirt support member bent after receiving a first force thereon.

The orientation of the skirt support member 12 and the elongate element 64 in its first cross-sectional shape in FIGS. 3-5 in which it can support the skirt 20. When an object strikes the skirt 20 it may deflect and the elongate element 64 can likewise deflect so that it assumes a second cross-sectional shape as shown with reference to FIG. 6. Here, the skirt 20 is connected to the skirt support member 12 at the skirt attachment 18 that includes six bolts, three of which can be seen in the figure. The attachment location 38 is designated at a height in the vertical direction 26 that corresponds with the middle two of the bolts of the skirt attachment 18. As the elongate element 64 is bent from the first cross-sectional shape, a portion of it compresses at the turn radius and the rest above and below this turn radius may change shapes. The elongate element 64 is in the second cross-sectional shape in FIG. 6 and maintains this shape while holding the skirt 20 and can spring back into the first cross-sectional shape when the force from the object is removed, such as once the skirt 20 moves over the curb and out of engagement therewith so that the buckling force is removed. The elongate element 64 will spring back to the first cross-sectional shape and configuration as shown in FIGS. 3-5, and there will be no damage or permanent deformation to the elongate element 64 as it is designed to make this type of return. The skirt support member 12 thus has a first bending modulus in the FIGS. 3-5 configuration that resists bending to a certain degree, and has a second bending modulus in the FIG. 6 configuration different than the first bending modulus in which bending in this configuration is resisted to a different degree.

The elongate element 64 is in sliding connection with the skirt attachment 18 so that when the elongate element 64 bends from the first cross-sectional shape to the second cross-sectional shape it shortens in the vertical direction 26.

The height 24 of the aerodynamic trailer system 10 shortens when the elongate element 64 changes from the first cross-sectional shape to the second cross-sectional shape. As this happens, the elongate element 64 slides relative to the skirt attachment 18 and slides out of the bottom of the skirt attachment 18 as the length of the elongate element 64 shortens in the vertical direction 26. It is therefore the case that the elongate element 64 may extend below the skirt attachment in the vertical direction 26, and may be lower than the attachment location 38 in accordance with various exemplary embodiments during normal use and functioning of the aerodynamic trailer system 10. the skirt support member 12 is thus rigidly attached to the trailer 16 and coupled to the skirt 20 in a sliding engagement.

The skirt 20 has an upper section 40 that has a lower bending stiffness than the lower section 36. The lower section 36 extends from the attachment location 38 to the bottom of the lower side 30. The lower section 36 has a thickness 42 that is greater than a thickness 44 of the upper section 40. This increased thickness 44 causes the lower section 36 to be stiffer than the upper section 36 so that it has a greater bending stiffness than the upper section 40 and will not bend as easily. The bolts of the skirt attachment 18 may be located in both the lower section 36 and the upper section 40. The increased thickness of the lower section 36 can be achieved by adding an additional layer of material to the lower section 36 so that it has more material in it than the upper section 40 to achieve the higher bending stiffness. In other arrangements, material that is different than the upper section 40 can be added to the lower section 36 that has a higher bending stiffness to likewise result in a lower section 36 with a higher bending stiffness than the upper section 40.

Figure 7:
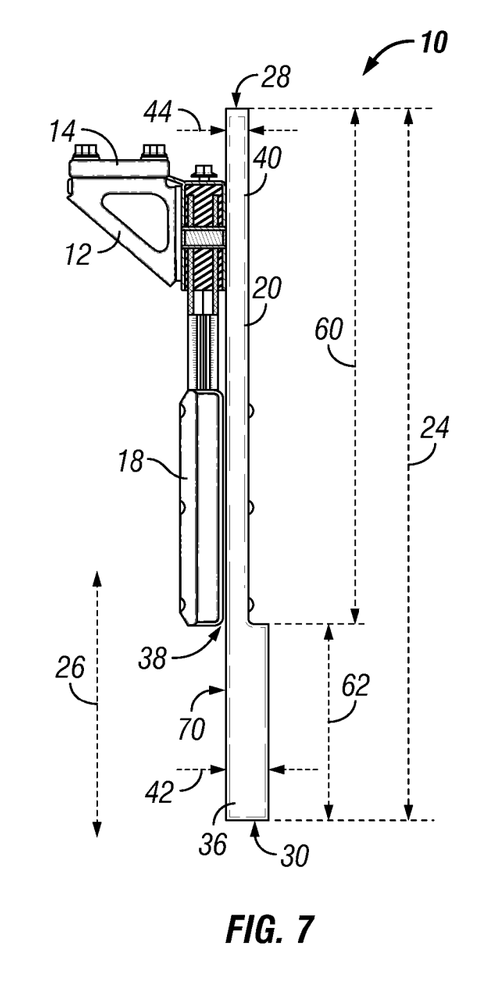
FIG. 7 is a side elevation view in partial cross-section of an aerodynamic trailer system with a skirt having a lower section thicker than an upper section.

FIG. 7 is an alternative exemplary embodiment of the aerodynamic trailer system 10 in which the attachment location 38 is located at the bottom of the skirt attachment 18 so that all of the lower section 36 extends below the skirt attachment 18 in the vertical direction 26. The bolts of the skirt attachment 18 are all located in the upper section 40, and none of the bolts of the skirt attachment 18 are located in the lower section 36. The thickness 42 is greater than thickness 44 so that the lower section 36 has a larger bending stiffness than the upper section 20. The length 60 can be larger than length 62 as well. As previously stated, the enhanced bending stiffness of the lower section 36 may be achieved by incorporating different materials or by treating the materials of the upper and lower sections 40, 36 differently. The upper and lower sections 40, 36 are arranged so a single plane 70 is formed by both of them that face underneath the trailer 16. The opposite side has a discontinuity present on the face formed by the upper and lower sections 40, 36. The single plane 70 may be formed on the outside of the trailer skirt 20 that faces away from the underside of the trailer 16 in other exemplary embodiments. The skirt attachment 18 may feature one or more attachment mechanisms such as bolts, clips or adhesion. The attachment location 38 may be at the lowest one of these attachment mechanisms in the vertical direction 26 and/or may be at the lowest level of engagement between the skirt attachment 18 and the skirt 20. The lowest in these regards is relative to the trailer attachment 14 such that the lowest is the point farthest from the trailer attachment 14 in the vertical direction 26.

The skirt 20 can be made up of a composite material, and the various panels 54, 56, 58 can be fiber reinforced polymer resin panels that have a range of 4-8 millimeters in thickness 42 that is the thickness of the lower section 36 that is at or below the attachment location 38. The upper section 40 may have a thinner thickness 44 that is in the 2-5 millimeter range. This difference in thickness may be achieved in multiple manners. Two dissimilar panels could be joined together using plastic welding or standard fasteners. The lower section 36 may be multiple layers of the same material as the upper section 40 but may include more layers than the upper section 40 so that it results in a stiffer and thicker section 36. Alternatively, a fold can be introduced into the lower section 36 to cause it to be thicker, or a strip of material could be attached to the lower section 36 to add more stiffness in that portion of the skirt 20 as compared to the upper section 40. In other instances, during manufacturing one side of the continuous process may lay down more product than the other side, thus creating a thin 44 portion of the skirt 20 and a thicker 42 section of the skirt 20. The design may provide for a reduction in weight of the aerodynamic trailer system 10 and thus the trailer 16 in general because weight of the upper section 40 will be reduced.

Figure 8:
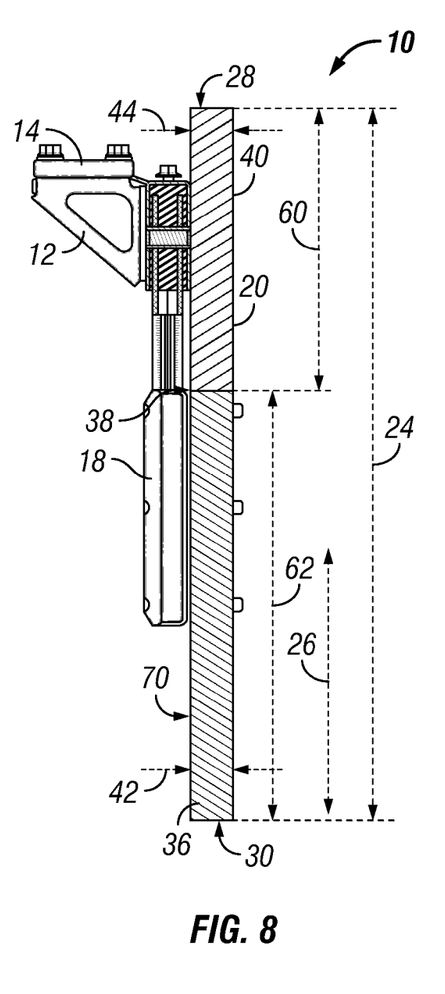
FIG. 8 is a side elevation view in partial cross-section of an aerodynamic trailer system with a skirt having an upper section made from a different material than a lower section.

FIG. 8 is an alternative exemplary embodiment of the aerodynamic trailer system 10 in which the skirt support member 12 is again a bi-modulus skirt support member 12 as previously discussed. The skirt 20 is attached to the skirt attachment 18 and the attachment location 38 is at the very top of the skirt attachment 18 so that none of the skirt attachment 18 is above the lower section 36 in the vertical direction 26. All of the bolts of the skirt attachment 18 are located in the lower section 36. The thickness 44 of the upper section 40 is the same as the thickness 42 of the lower section 36. The upper section 40 has a lower bending stiffness than the lower section 36 due to the upper section 40 being made out of a different material than the lower section 36, or due to the fact that the upper section 40 or lower section 36 are treated or processed differently from one another to cause them to have a different bending stiffness from one another.

The entire lower section 36 from the lower side 30 to the attachment location 38 along the entire length 50 may have a higher degree of bending stiffness than the entire upper section 40 from the attachment location 38 to the upper side 28 along the entire length 52 at all locations. In practice, the upper section 40 need not have as high of a degree of stiffness because the presence of the skirt support members 12 functions to increase the stiffness of the upper section 40 as they provide support thereto. The lower section 36 is not supported by or stiffened by the skirt support members 12, and thus its stiffness is provided by the bending stiffness of the cantilevered lower section 36 itself. The skirt 20 this made so that has uneven sections of bending stiffness and does not have the same bending stiffness throughout its length 22 and height 24.

The lower section 36 and upper section 40 have a different minimum radius of curvature before plastic deformation. This different minimum radius of curvature may be a property of the material making up the lower section 36 and upper section 40, or may be a property of the lower section 36 and upper section 40 that factors in both their material make up, material treatment, and size and geometry. The radius of curvature is the distance from an axis of a circle to the curved portion of the circle. The radius of curvature before plastic deformation is the amount of curvature the section experiences when bending has been applied until it reaches the state in which plastic deformation occurs and the material will no longer spring back to its original shape but instead will return to a different shape or have reduced strength or have cosmetic damage such as delamination in a composite material. The radius of curvature is measured about a longitudinal axis of skirt 20 which extends in the length 22 direction of the skirt 20 and may be parallel to the longitudinal direction 48. The upper section 40 has a smaller radius of curvature before plastic deformation of the upper section 40 than the radius of curvature of the lower section 36 before the lower section 36 experiences plastic deformation. In this regard, the upper section 40 has a smaller minimum radius of curvature than the lower section 36. By reducing thickness of the upper section 40 the upper section can be bent farther without exceeding the strain limit where plastic deformation or breakage may occur.

The skirt support member 12 provides some degree of stiffness to the skirt 20 and the length of extension of the skirt support member 12 in the vertical direction 26 will influence the bending stiffness of the skirt 20. If the skirt support member 12 extends and is attached to the upper section 40 it will impart bending stiffness to the upper section 40 to make it stiffer, while the skirt support member 12 is not present in the lower section 36 and does not add or decrease bending stiffness to the lower section 36. It is therefore the case that the length of the skirt support member 12 can influence the material making up the upper section 40 because its length will increase length 60 and will effect selection of a different material or material treatment versus the lower section 36. The relative height of the upper section 40 to the lower section 36 represented by lengths 60 and 62 may also influence the selection of the geometry and composition of the sections 40, 36 to ensure the lower section is more rigid than the upper section 40. Generally, a longer length 60, 62 will cause the section 40, 36 to bend more and thus be less stiff. The lengths 60, 62 can be sized relative to one another. The attachment location 38 may be at least half of the way down the height 24 of the skirt 20. In this regard, the upper section 40 may have a length 60 that extends at least half of the overall height 24 of the skirt 20 from the upper side 28. The lower section 36 will have a length 62 that is equal to or less than half of the overall height 24 of the skirt 20. The aerodynamic trailer system 10 is arranged so that the skirt 20 has stiffness removed in its upper section 40 in comparison to its lower section 36. The upper section 40 is farther away from the ground when the aerodynamic trailer system 10 is configured with the trailer 16.

Figure 9:
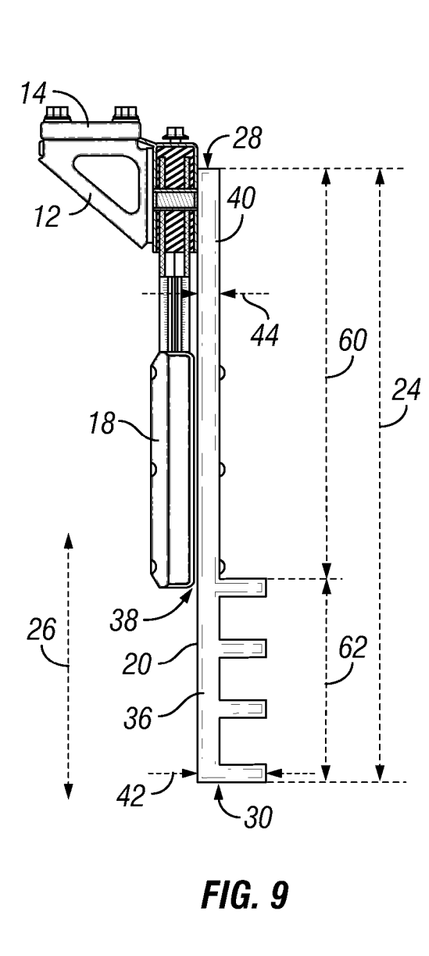
FIG. 9 is a side elevation view of an alternative arrangement of the aerodynamic trailer system 10.

The aerodynamic trailer system 10 may incorporate a skirt support member 12 that is of various designs. Another such design is shown with reference to FIG. 9 in which the skirt support member 12 is not a bi-modulus design. The skirt support member 12 has a skirt attachment 18 that can be made of the same material throughout its length and does not have a feature that allows it to resist two different bending moduli. The skirt attachment 18 can be connected to the skirt 20 through adhesion, welding, or any other attachment, and the attachment location 38 is at the very bottom edge of the skirt attachment 18. The length 60 is the same as the lengths 62, and the upper section 40 is more flexible than the lower section 36. Lower section 36 has a series of ridges that cause it to have a thickness 42 in certain places to be greater than the largest thickness 44.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An aerodynamic trailer system, comprising:
   a skirt support member, wherein the skirt support member has a trailer attachment that attaches the skirt support member to a trailer, wherein the skirt support member has a skirt attachment that attaches the skirt support member to a skirt; and
   the skirt that has a length and a height, wherein the height extends in a vertical direction of the aerodynamic trailer system, wherein the skirt has an upper side, a lower side, a front side, and a rear side, wherein the skirt has a lower section that extends in the vertical direction from the lower side to an attachment location with the skirt attachment, wherein the skirt has an upper section that extends in the vertical direction from the attachment location to the upper side, wherein the lower section has a higher bending stiffness than the upper section such that the upper section from the attachment location to the upper side in the vertical direction is more flexible than the lower section from the attachment location to the lower side in the vertical direction, wherein the upper section is above the lower section;
   wherein the difference in bending stiffness between the lower section and the upper section is achieved by a difference in size between the upper section and lower section, a difference in material composition between the upper section and lower section, or a combination of both difference in size and difference in material composition;
   wherein the skirt support member has an elongate element that slides relative to the skirt attachment such that a bottom end of the elongate element is a free end and is free from engagement with the skirt attachment and slides below the skirt attachment so as to be located completely below both the skirt attachment and the attachment location in the vertical direction.

2. The aerodynamic trailer system as set forth in claim 1, wherein the sizes are different such that a thickness of the lower section is greater than a thickness of the upper section.

3. The aerodynamic trailer system as set forth in claim 1, wherein the material compositions are different such that the material making up the upper section has a lower bending stiffness than the material making up the lower section.

4. The aerodynamic trailer system as set forth in claim 1, wherein the skirt support member has a length that extends in a longitudinal direction of the aerodynamic trailer system, wherein the length of the skirt extends in the longitudinal direction of the aerodynamic trailer system, wherein the lower section and upper section have lengths in the longitudinal direction of the aerodynamic trailer system that are the same distances as the length of the skirt support member.

5. The aerodynamic trailer system as set forth in claim 1, wherein the lower section extends from the front side to the rear side, and wherein the upper section extends from the front side to the rear side.

6. The aerodynamic trailer system as set forth in claim 1, further comprising multiple additional skirt support members that are attached to the trailer and that are attached to the skirt.

7. The aerodynamic trailer system as set forth in claim 1, wherein the skirt is made of multiple skirt central panels, a rear trailer skirt panel, and a front trailer skirt panel, wherein the lower section and the upper section are located at one of the multiple skirt central panels.

8. The aerodynamic trailer system as set forth in claim 1, wherein a length of the upper section in the vertical direction is greater than a length of the lower section in the vertical direction.

9. The aerodynamic trailer system as set forth in claim 1, wherein the upper section and the lower section define a single planar section that extends from the upper side to the lower side through the upper section and the lower section in the vertical direction.

10. The aerodynamic trailer system as set forth in claim 1, wherein the upper section has a smaller radius of curvature before plastic deformation of the upper section than the lower section's radius of curvature before plastic deformation of the lower section.

11. The aerodynamic trailer system as set forth in claim 1, wherein the elongate element extends from the trailer attachment to the skirt attachment, wherein the skirt attachment is a bracket through which the elongate element slides when the skirt is impacted and deflected, wherein when the skirt is impacted and deflected the elongate element moves to a location lower than the attachment location in the vertical direction.

12. The aerodynamic trailer system as set forth in claim 11, wherein the elongate element resists bending by having a first bending modulus, wherein when sufficient force is applied to overcome the first bending modulus the elongate element buckles without plastic deformation to a buckled configuration at which time the elongate element resists additional bending by having a second bending modulus.

13. An aerodynamic trailer system, comprising:
- a skirt support member, wherein the skirt support member has a trailer attachment that attaches the skirt support member to a trailer, wherein the skirt support member has a skirt attachment that attaches the skirt support member to a skirt; and
- the skirt that has a length and a height, wherein the height extends in a vertical direction of the aerodynamic trailer system, wherein the skirt has an upper side, a lower side, a front side, and a rear side, wherein the skirt has a lower section that extends in the vertical direction from the lower side to an attachment location with the skirt attachment, wherein the skirt has an upper section that extends in the vertical direction from the attachment location to the upper side, wherein the lower section has a higher bending stiffness than the upper section such that the upper section from the attachment location to the upper side in the vertical direction is more flexible than the lower section from the attachment location to the lower side in the vertical direction, wherein the upper section is above the lower section;
- wherein the difference in bending stiffness between the lower section and the upper section is achieved by a difference in size between the upper section and lower section, a difference in material composition between the upper section and lower section, or a combination of both difference in size and difference in material composition;
- wherein the skirt support member has an elongate element that extends from the trailer attachment to the skirt attachment, wherein the skirt attachment is a bracket through which the elongate element slides when the skirt is impacted and deflected, wherein when the skirt is impacted and deflected the elongate element moves to a location lower than the attachment location in the vertical direction;
- wherein the elongate element comprising a plurality of sheets of spring steel that are V-shaped wherein at least some of the plurality of sheets are open towards one another.

14. The aerodynamic trailer system as set forth in claim 1, wherein the sizes are different such that the lower section has ridges that are not present at the upper section.

* * * * *